… … …

United States Patent [19]

Joseph et al.

[11] Patent Number: 5,504,318

[45] Date of Patent: Apr. 2, 1996

[54] ANALOG WAVEFORM DECODER USING PEAK LOCATIONS

[75] Inventors: Eugene B. Joseph, East Setauket; Theodosios Pavlidis, Setauket, both of N.Y.

[73] Assignee: Symbol Technologies, Inc., Bohemia, N.Y.

[21] Appl. No.: 192,889

[22] Filed: Feb. 7, 1994

Related U.S. Application Data

[63] Continuation-in-part of Ser. No. 96,579, Jul. 23, 1993, Pat. No. 5,311,001, which is a continuation of Ser. No. 759,332, Sep. 13, 1991, abandoned.

[51] Int. Cl.$^6$ ............................................. G06K 7/10
[52] U.S. Cl. ..................... 235/462; 235/463; 382/181; 382/209
[58] Field of Search ......................... 235/462, 463; 382/10, 30, 181, 209

[56] References Cited

U.S. PATENT DOCUMENTS

| | | | |
|---|---|---|---|
| 5,073,954 | 12/1991 | Van Tyne et al. | 382/18 |
| 5,128,527 | 7/1992 | Kawai et al. | 235/462 |
| 5,140,146 | 8/1992 | Metlitsky et al. | 235/462 |
| 5,196,685 | 3/1993 | Izumi | 235/462 |

OTHER PUBLICATIONS

Ehrich et al., "Representation of Random Waveforms by Relational Trees," IEEE Transactions on Computers, vol. C–25, No. 7, pp. 725–736 (Jul. 1976).

Eklundh et al., "Peak Detection Using Difference Operators," IEEE Transactions on Pattern Analysis and Machine Intelligence, vol. PAMI–1, No. 3, pp. 317–325 (Jul. 1979).

Horowitz, "A Syntactic Algorithm for Peak Detection in Waveforms with Applications to Cardiography," Communications of the ACM, vol. 18, No. 5, pp. 281–285 (1975).

Kiryati et al., "Gray Levels Can Improve the Performance of Binary Image Digitizers," CVGIP: Graphical Models and Image Processing, vol. 53, No. 1, pp. 31–39 (Jan. 1991).

Pavlidis, "Algorithms for Shape Analysis of Contours and Waveforms," IEEE Transactions on Pattern Analysis and Machine Intelligence, vol. PAMI–2, No. 4, pp. 301–312 (Jul. 1980).

Pavlidis et al., "Fundamentals of Bar Code Information Theory," Computer, pp. 74–86 (Apr. 1990).

*Primary Examiner*—Donald T. Hajeo
*Assistant Examiner*—Jeffrey R. Filipek

[57] ABSTRACT

A method for decoding an analog waveform corresponding to a symbol comprises detecting the extrema locations of the waveform, and creating a feature vector from these extrema locations. The feature vector is compared to stored reference arrays corresponding to each symbol from an alphabet of possible symbols using statistical pattern recognition techniques to decode the waveform. The invention also features an analog waveform decoder that has reference storage for holding reference arrays, and a processor that creates and decodes a feature vector for the analog waveform.

70 Claims, 7 Drawing Sheets

ANALOG WAVEFORM DECODER USING PEAK LOCATIONS

CROSS REFERENCE TO RELATED APPLICATIONS

This application is a continuation in part of U.S. application Ser. No. 08/096,579, now U.S. Pat. No. 5,311,001 filed on Jul. 23, 1993 (hereby incorporated by reference), which is a continuation of U.S. application Ser. No. 07/759,332, filed on Sep. 13, 1991, now abandoned.

BACKGROUND OF THE INVENTION

This invention relates to decoding analog waveforms corresponding to symbols, such as bar code symbols.

Machine-readable symbols are used in various industries to uniquely identify products. Of these symbols, bar codes are among the simplest and most widely used.

Bar codes consist of a series of parallel light and dark stripes of varying widths. Information is encoded in the relative width of the stripes, so that a sequence of a fixed number of stripes represents a character. A set of characters forms an alphabet that is defined by a symbology. An example of a binary bar code symbology having only two possible widths is CODE39; UPC is an example of a four-level code.

In the UPC symbology, a symbol consists of four stripes. The sum of the widths of the stripes normalized to the narrowest equals seven. For example, the character "6" is encoded by a symbol having adjacent stripe widths {1,1,1,4}, where "1" represents the variable width of the narrowest stripe. Current decoding techniques generally estimate the width of each stripe separately, find the narrowest width, and normalize the sequence of widths to a series of integers, e.g. {0.5,0.5,0.5,2.1} is mapped to {1,1,1,4}.

Bar code readers often shine a narrow light beam, e.g. a laser beam, across a bar code symbol and detect the reflected image with a photodetector. The analog output of the photodetector is then digitized. Transitions from light to dark, or edges, are detected in the resulting digitized pattern, and the bar code stripe widths are calculated from the locations of these edges. The calculated sequence of stripe widths is then compared to known reference symbols in a lookup table to identify the bar code symbol.

Inaccuracies in bar code decoding may result from the spreading of ink from a dark stripe into a light stripe in a printed symbol. Another source of error is convolution distortion, which results when the edges of a light beam centered on a stripe interact and reflect from adjacent stripes. This causes a blurring of the waveform output from the photodetector. The problem of edge interaction limits the working range of currently available bar code readers.

SUMMARY OF THE INVENTION

In general, in one aspect, the invention features a method for decoding an analog waveform corresponding to a symbol, for example, the analog waveform output from a photodetector in a bar code scanner. The method comprises first storing a reference array corresponding to each symbol from the alphabet of possible symbols to be decoded. The analog waveform is then analyzed to find the locations of extrema (peaks and valleys) in the waveform. A feature array for the waveform is produced from these extrema locations. The waveform is then decoded by comparing the feature array to the stored reference arrays.

In general, in another aspect, the invention features a decoder that operates directly upon an analog waveform representative of a symbol. The decoder comprises storage for holding a set of reference arrays, where each reference array corresponds to a symbol from an alphabet of possible symbols, and a processor that finds the locations of extrema in the waveform. The processor also forms a feature array for the waveform from the extrema locations, and decodes the waveform by comparing the feature array to the reference arrays.

The invention provides a highly accurate analog decoding technique, which differs from current bar code decoding techniques in that it does not treat each stripe in a symbol individually, but groups all the stripes together to form a feature vector. The elements of the feature vector are not the widths of the stripes but the distances between extrema of the analog waveform output from a bar code reader. In the absence of significant noise, these extrema locations correspond to the midpoints of the bar code stripes.

The decoder employs a robust decoding technique which detects extrema locations in a waveform without introducing additional convolution distortion, and processes the waveform in a single pass. The decoder is insensitive to errors introduced by ink spread in the printed symbol, since the peak locations corresponding to the midpoints of the bar code stripes remain unchanged as the ink spreads away form these midpoints. The decoder is also more immune to convolution distortion than decoders that detect edge locations in the waveform, since an edge must first affect one of its two bounding edges that form an extremum before the extremum itself experiences any interaction from that edge.

The decoder is capable of accurately reading both high density and low density symbols. The analog waveform decoder also decodes non-binary codes, e.g. UPC, while exhibiting a performance at least equal to that of binary decoders, such as the LS2000 system available from Symbol Technologies. The analog waveform decoder described here tolerates higher levels of convolution distortion than the LS2000 system, since it can decode higher densities and exhibits at least a 43% increase in maximum scanning distance, or standard deviation in the point spread function of the light beam used to read the symbol. The decoder also has high noise immunity, since it exhibits a zero misdecode rate over a broad range of signal to noise ratios and decode rates. This robustness allow the decoder to meet the industry standard of only 1 in a million misclassified symbols for the CODE39 symbology.

Other features and advantages will be apparent from the following description of the preferred embodiments and from the claims.

DESCRIPTION OF THE PREFERRED EMBODIMENTS

Figure 1:
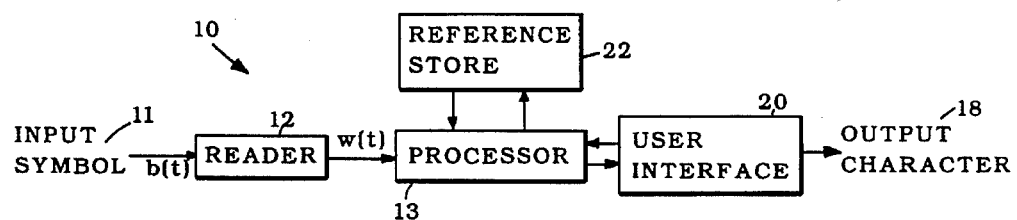
FIG. 1 is a block diagram of an analog waveform decoder.
Figure 12:
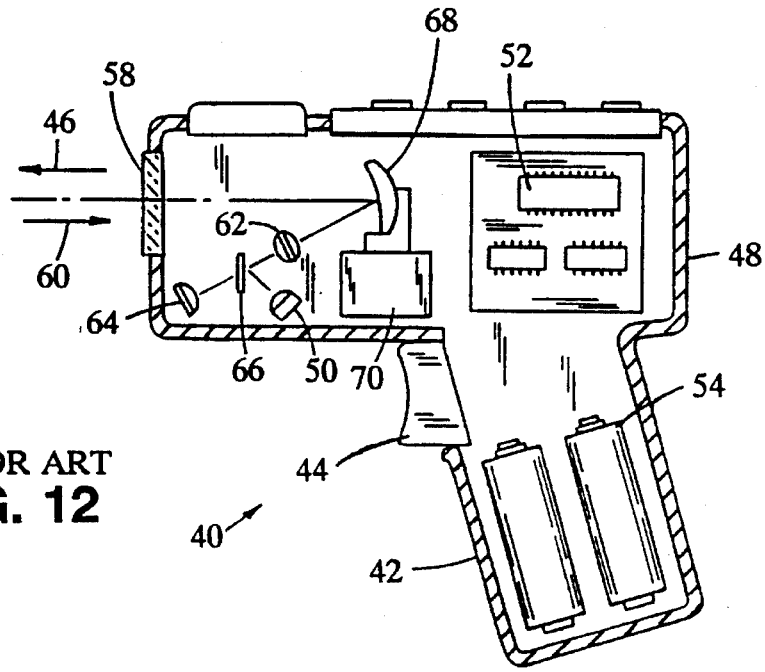
FIG. 12 is an elevation view, partially cross sectioned, of a hand-held bar code reader of a type which could embody, or be used in conjunction with, the invention.

The analog waveform decoder 10 of FIG. 1 scans an input symbol 11 with reader 12 (such as the hand-held bar code reader shown in FIG. 12). The reader contains a light source which directs a narrow beam on the input symbol, and a photodetector that detects the reflected beam. A processor 13 analyzes the analog waveform 14 output from the reader, and outputs the character 18 encoded by the symbol through a user interface 20.

The processor interacts with a reference store 22 holding a list of all symbols and their corresponding characters in a symbology. The list is compiled in a training sequence, in which each symbol is read by the reader, transformed into a standard format by the processor, and stored in the reference store. The user inputs the character corresponding to the symbol through the interface, and the processor stores the character alongside the transformed symbol in the list. Alternatively, a symbol list from a standard symbology may be hard-wired into the reference store before using the decoder. The format of the reference store is described in more detail below.

Figure 2A:
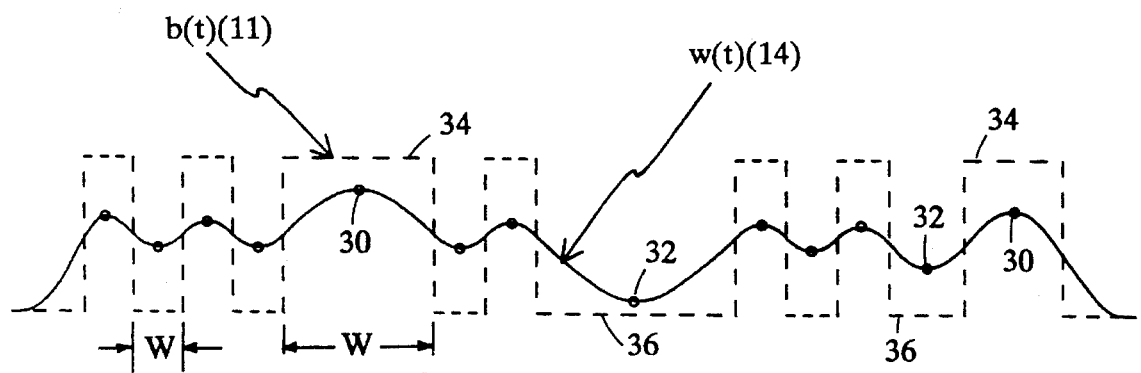
FIGS. 2(a) and 2(b) are graphs of waveforms in the decoder of FIG. 1.

In binary symbol decoding, for example, for bar codes, the reader output w(t) consists of a series of peaks 30 and valleys 32 of varying widths W (see FIG. 2) corresponding to the dark stripes 34 and light stripes 36 of the bar code pattern b(t) 11, respectively. The analog waveform w(t) is the convolution of the point spread function (PSF) of the light beam and the bar code pattern b(t). A typical PSF has a Gaussian profile $h(t)=1/(2\pi\sigma^2)^{1/2}\exp(-(t-m)^2/2\sigma^2)$, where m is the meand and $\sigma$ is the standard deviation. If the support (or four times the standard deviation, $\sigma$) of the Gaussian is smaller than twice the distance between adjacent peaks in the bar code pattern, the peaks in the reader output occur at the midpoints of the bar code stripes. This is a result of at most two adjacent edges interacting simultaneously with the peak during convolution.

Figure 2B:
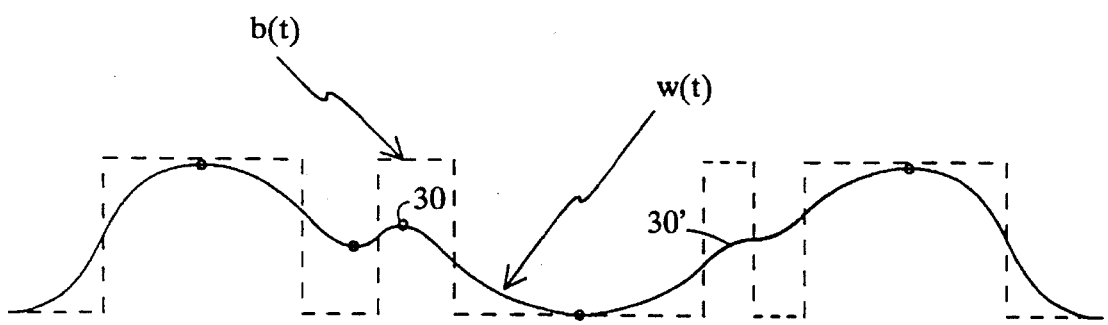

As the support of the Gaussian beam increases, the convolution of the large Gaussian beam with the bar code pattern causes a smoothing of the photodetector signal. This smoothing effect is called convolution distortion, and results from a much higher degree of peak-edge interaction during convolution. As seen in FIG. 2(b), convolution distortion causes some peaks to move away from the midpoints of the bar code stripes, and other peaks, e.g. peak 30', to disappear altogether.

The analog waveform decoder relies primarily on the locations of peaks in the waveform as indicators of the midpoints of stripes in the bar code. Noise removal and deblurring algorithms are implemented by the processor to correct for the convolution distortion caused by an intermediate level of peak edge interaction, such as that illustrated in FIG. 2(b).

Figure 3:
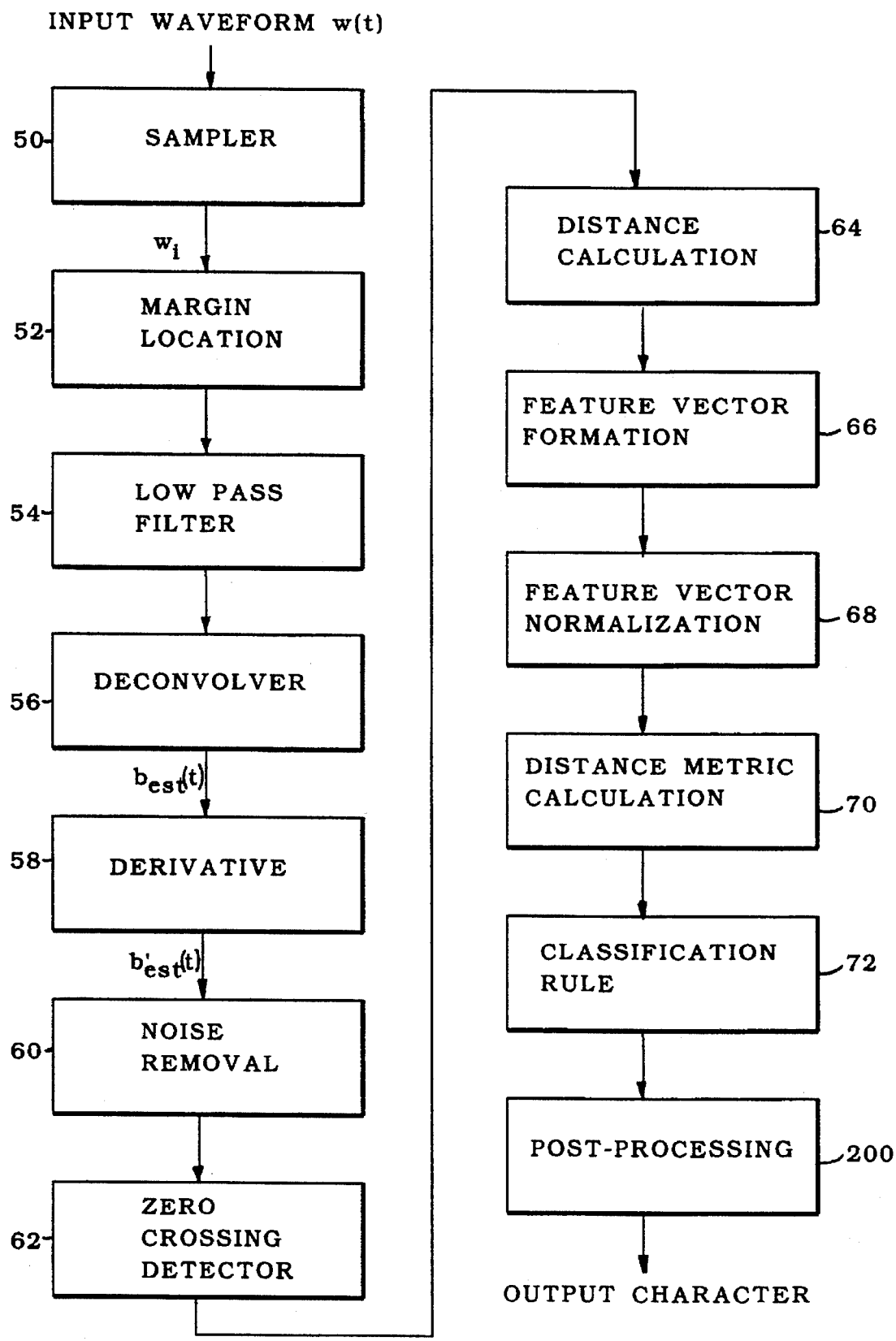
FIG. 3 is a block diagram of a processor in the decoder.

As shown in FIG. 3, the processor first samples the photodetector output at 16,000 data points at a sampling rate of 500 Khz, and stores 12 bits per data point (step 50). Linear interpolation is used in subsequent steps to obtain feature locations that are not coincident with the sampling points.

The processor analyzes the sampled waveform to find the margins of the decodable portion of the waveform in a step 52. The margin locating algorithm, described in detail in U.S. Pat. application Ser. No. 08/096,579, U.S. Pat. No. 5,311,001, incorporated by reference, detects a change in the statistics of the waveform at a point where the bar code signal ends and the background noise begins.

The decodable portion of the waveform is passed through a low pass filter 54 in the processor to remove high frequency noise from the waveform. The processor then deconvolves the filtered waveform with an estimate of the PSF of the light source to remove some of the effects of convolution distortion, for example, to restore the lost peaks in FIG. 2(b) (step 56). The deconvolved function now provides a deblurred estimate of the waveform.

Zero crossings of the derivatives of the deblurred waveform indicate the extrema locations; the derivative of the estimator function may still contain significant amounts of noise, however. After taking the derivative of the estimator (step 58), the processor implements a noise removal algorithm (step 60) to reduce the effects of noise before locating the zero crossings of the derivative of the estimator (step 62). The processor then compiles a feature array (step 66) listing the distances between the peak locations of the deblurred waveform (step 64), and normalizes this array (step 68). The feature array is matched to the closest reference arrays in storage by a classification rule (step 72) using a distance metric (step 70), and the character corresponding to the closest reference array is output by the processor.

The deblurring or deconvolution of the waveform proceeds as follows. The photodetector output w(t) is the convolution of the PSF h(t) of the light beam and the original bar code symbol pattern b(t). b(t) can be recovered by deconvolving w(t) with the PSF h(t). In the Fourier transform domain, $$W(\omega)=kH(\omega)B(\omega)$$

$$B(\omega)=kW(\omega)H(\omega)^{-1} \quad (1)$$

where $W(\omega)$, $H(\omega)$ and $B(\omega)$ are the Fourier transforms of w(t), h(t) and b(t), respectively, and where k is an unknown gain of the bar code reader. If h(t) is Gaussian with standard deviation $\sigma$, then $$H^{-1}(\omega) = \frac{1}{\sqrt{2\pi}\ \sigma} [1+\sigma^2\omega^2/2+\sigma^4\omega^4/8+\sigma^6\omega^6/48+\ldots] \quad (2)$$

A partial deconvolution is obtained by retaining only the first two terms of Equation (2). This is adequate to deblur the waveform if the standard deviation $\sigma$ of the PSF is smaller than the minimum stripe width T of the symbol pattern b(t). Substituting truncated $H(\omega)$ into Equation 1, and inverse transforming yields the following estimate for b(t):

$$b_{est}(t)=p[w(t)-qw''(t)] \quad (3)$$

where $p=1/(k[2\pi]^{1/2}\ \sigma)$, $q=\sigma^2/2$ and w"(t) indicates the second derivative of w(t).

In calculating $b_{est}$, the standard deviation $\sigma$ is estimated from w(t) as follows.

Assume b(t) has only one edge at $t=t_0$, then $$w(t) = kh(t) * b(t) \qquad (4)$$
$$w'(t) = kh(t) * b'(t)$$
$$= kh(t) * \delta(t - t_0)$$
$$= kh(t - t_0)$$

For Gaussian $h(t)$, $$w'(t) = ke^{-(t-t_0)^2/(2\sigma^2)} \qquad (5)$$

$$w'''(t) = -\frac{k}{\sigma^2} e^{-(t-t_0)^2/(2\sigma^2)} [1 - (t - t_0)^2/\sigma^2]$$

Dividing $w'(t)$ by $w'''(t)$ and evaluating the result at $t_0$ yields the following estimate for $\sigma$:

$$\sigma^2 = -\frac{w'(t_0)}{w'''(t_0)} \qquad (6)$$

Figure 4:
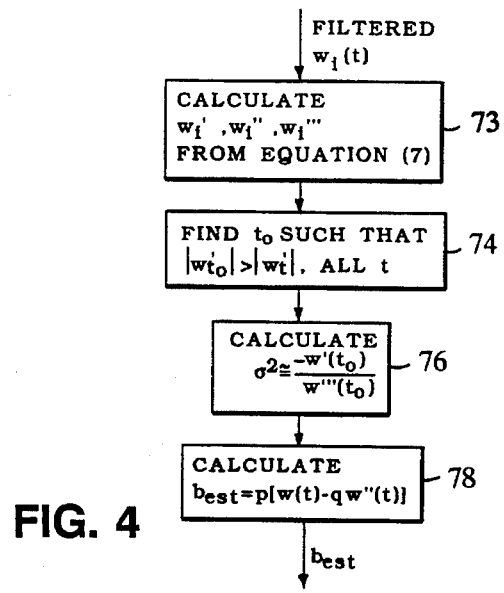
FIG. 4 is a block diagram of a deconvolver in the processor of FIG. 3.

Referring now to FIG. 4, the processor deconvolves $w(t)$ by first calculating the derivatives of $w(t)$ in step 73 from sample points $w_i(t)$ with the followed smoothed derivative:

$$w_i' = \left( \frac{1}{3} \left[ \frac{x_i - x_{i-2}}{2} + \frac{x_{i+1} - x_{i-1}}{2} + \frac{x_{i+2} - x_i}{2} \right] \right) \qquad (7)$$

$$= \frac{1}{6} (x_{i+2} + x_{i+1} - x_{i-1} - x_{i-2})$$

The derivative suppresses quantization noise in $w(t)$. In decoding low density waveforms, the signal to noise ratio of the waveform may be low. In this case, noise is reduced by applying additional smoothing to the interpolated waveform and then reprocessing it. This effectively decreases the cutoff frequency $\omega_0$ of the low pass filter, discussed above.

After finding the derivatives, the processor estimates the variance of the PSF $h(t)$ by using Equation (6) (step 76). Since isolated edges are rarely found in bar codes, Equation (4) is applied to the edge with the least edge interaction. This occurs at the point where the first derivative of $w(t)$ is maximum, so that $t_0$ is defined as the point where $|w'(t_0)| \geq |w'(t)|$ for all $t$ (step 74). The processor then calculates the deblurred function $b_{est}$ from the estimate of $\sigma$ and Equation (3) above (step 78).

Figure 5:
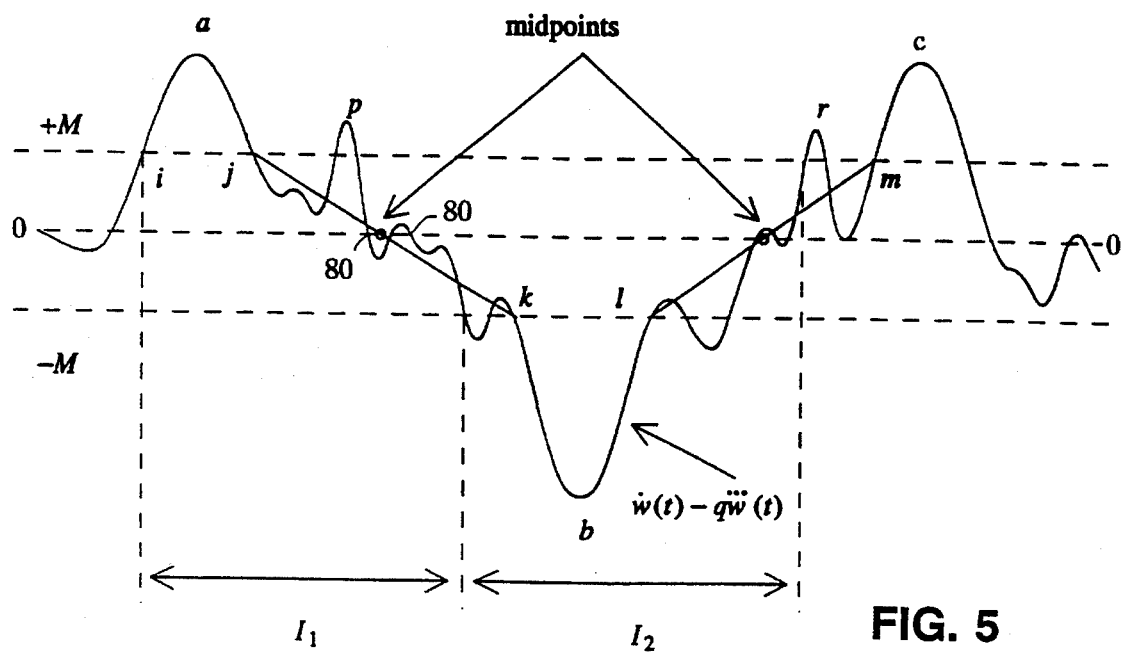
FIG. 5 is a waveform in the processor.

The zero crossings of the first derivative of $b_{est}$ indicate the peak locations in $b_{est}$, which, in the absence of noise or very high peak-edge interaction, correspond to the midpoints of the stripes in the bar code. As shown in FIG. 5, however, noise can cause spurious zero crossings, e.g., at points 80.

Figure 6:
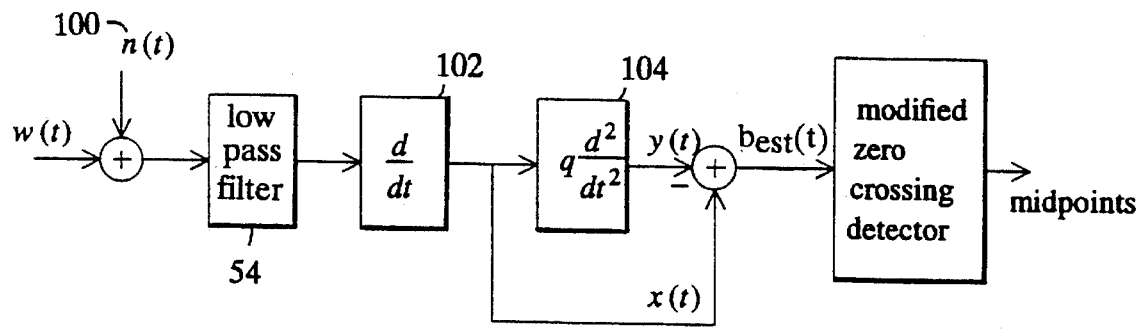
FIG. 6 is a block diagram model of a function used in the processor.

The effects of additive noise $n(t)$ 100 are modeled in FIG. 6. The component of $b_{est}$ due to noise, $b_n(t)$, is Gaussian if $n(t)$ is Gaussian, since the (ideal) low pass filter $g(t)$ 54 and the derivative stages 102, 104 are linear. The noise in the deblurred function is therefore characterized by a standard deviation $\sigma_{bn}$ which is estimated from the root mean square (RMS) of $b'_{est}$ over the entire decodable portion of the waveform.

Figure 7A:
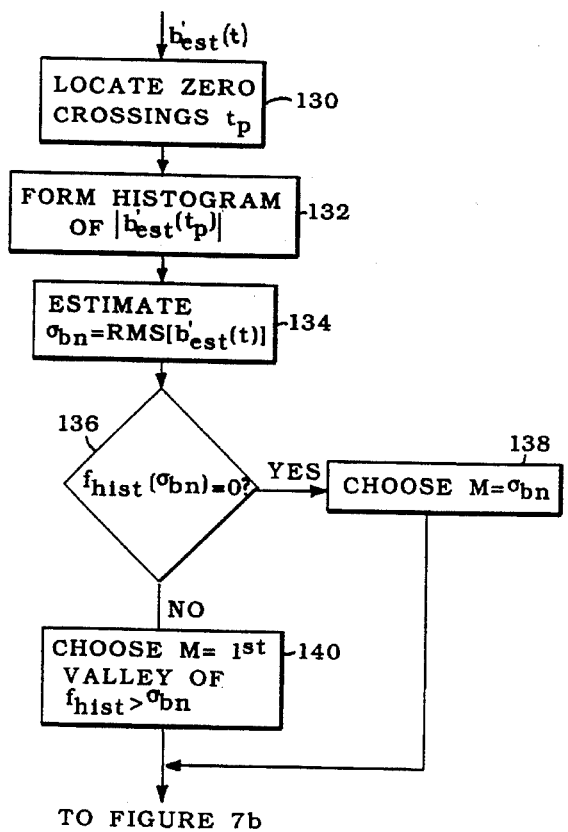
FIGS. 7(a) and 7(b) are block diagrams of a noise removal algorithm in the processor.
Figure 7B:
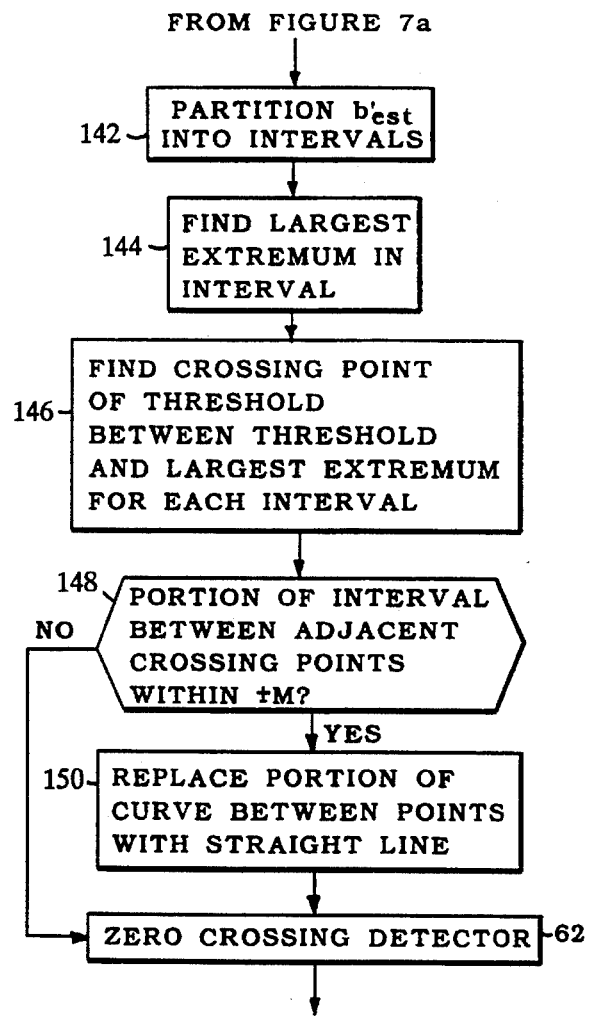
Figure 8:
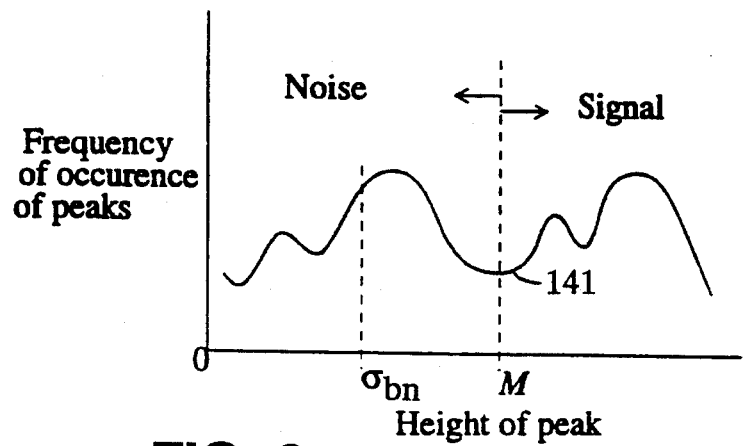
FIG. 8 is a histogram of peaks of a waveform in the processor.

The noise removal algorithm (step 60) of the processor proceeds by first estimating a threshold M under which oscillations in $b'_{est}$ are considered to be purely due to noise. As shown in FIG. 7, the first step 130 is to locate the zero crossings of $b'_{est}$ at point $t_p$ and to generate a histogram $f_{hist}$ of the height of the peaks of $b'_{est}$ (step 132), illustrated in FIG. 8. Next, the standard deviation due to noise $\sigma_{bn}$ is estimated from RMS of $b'_{est}$ (step 134). If $f_{hist}(\sigma_{bn})=0$ (step 136), then the processor chooses the threshold $M=\sigma_{bn}$ (step 138). Otherwise, M is chosen as the first trough of $f_{hist}(x)$ where x is greater than $\sigma_{bn}$ (step 140), e.g. at point 141 shown in FIG. 8.

Next, the processor uses the thresholds $\pm M$ to partition $b'_{est}$ into a set of non-overlapping intervals (step 142). Each interval begins at the point where one threshold is crossed, and ends when the other threshold is crossed, e.g. intervals $I_1$ and $I_2$ of FIG. 5. For each interval, the processor finds the highest peak or deepest valley enclosed in that interval; this corresponds to points a and b for intervals $I_1$ and $I_2$, respectively (step 144). Next, the processor locates the points where $b'_{est}$ crosses the threshold between the highest peak or deepest valley of the interval: points i and j for peak a, points k and l for valley b and point m for peak c (step 146). The processor then connects with straight lines the points found in step 146 if they are adjacent and the part of $b'_{est}$ enclosed by these points lies within the $\pm M$ noise band. In the example shown in FIG. 5, points j and k and points l and m are connected. The processor then locates the zero crossings of the line segments from the previous step and uses them as estimates of the midpoint locations.

Figure 9:
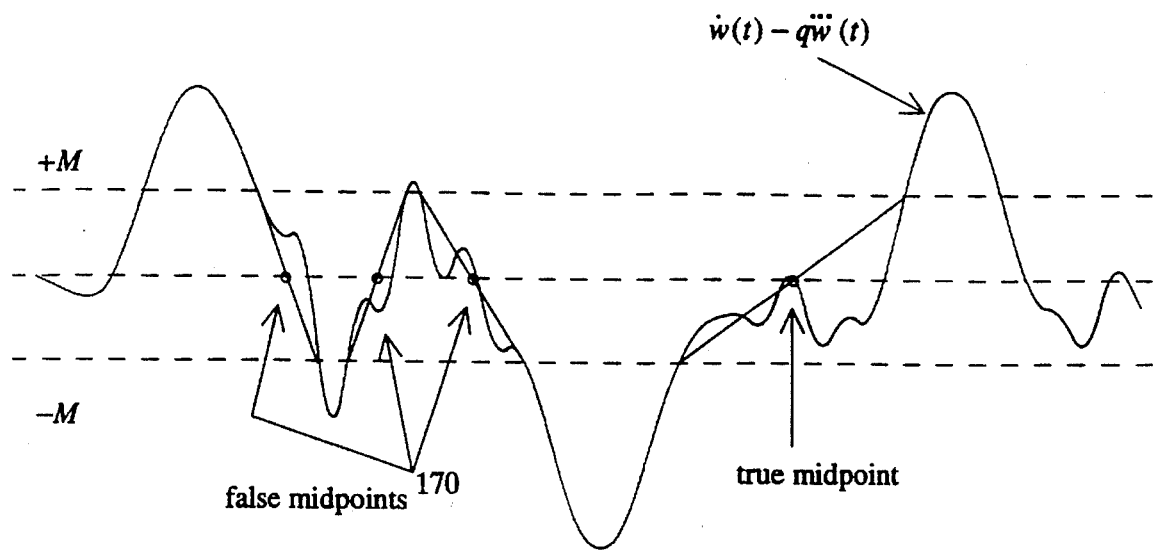
FIGS. 9 and 10 are waveforms in the processor.

Small projections of the noise peaks outside the thresholds do not affect the location of the midpoint, e.g. points p and r of FIG. 5. If a noise transition is large enough to span the $\pm M$ band within a single pulse, as shown in FIG. 9, then false midpoints 170 will be detected by the processor. For a pulse of width W, the probability of a false midpoint on a binary pulse is $$P[\text{false midpoint}] = P[b_{est}(t_1) \leq -M; b_{est}(t_2) \leq +M; 0, t_1 < t_2 < W] \qquad (8)$$

In the absence of a closed-form expression for Equation (8), one can estimate the probability as follows. In the linear system shown in FIG. 6, the deblurred waveform $b'_{est}(t)$ is the sum of a signal component $b'_w(t)$ and a noise component $b'_n(t)$. If T is the minimum pulse width in the waveform $b(t)$, then the cutoff frequency of low pass filter $g(t)$ is taken at $\pi/T$, or the highest frequency signal component in $b'_w(t)$. The low pass filter forces points on the noise component of $b'_{est}$ ($b'_n(t)$) to be highly correlated within any interval T, so that no ripples can exist within such an interval. The narrowest noise pulse on $b'_n(t)$ must therefore have a duration of at least T.

Figure 10:
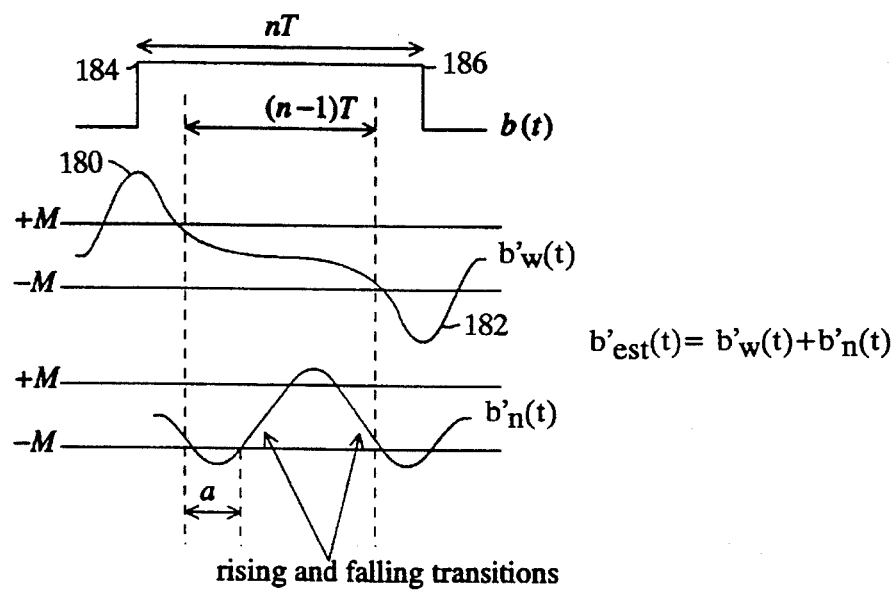

If the signal waveform has two pulses 180, 182 centered on the edges 184, 186 of $b(t)$ of minimum width T, as illustrated in FIG. 10, then the noise waveform is significant only in the interval $(n-1)T$, assuming the strength of the signal pulses is much higher than those due to noise. False midpoints result when the signal and noise transitions are in opposite directions, yielding a waveform of the type shown in FIG. 9. In FIG. 10, therefore, only a rising noise transition can cause a false midpoint. Assuming that $b_w(t)$ is approximately zero on interval $(n-1)T$, then the probability of a false midpoint on nT is given by $$P[\text{false midpoint on } nT] = \qquad (9)$$
$$P[b_{est}'(t_1) \leq -M; b_{est}'(t_2) \geq +M; 0.5T < t_1 < t_2 < (n - 0.5)T] \approx Pp\, b_n'(t_1) \leq -M; b_n'(t_2) \geq -M; 0.5T < t_1 < t_2 < (n - 0.5)T]$$

In CODE39 symbology, n is between 2 and 3, and at most a single rising transition is possible in the $(n-1)T$ interval. The probability that this transition occurs is small and decreases as the value of M increases. However, increasing M also increases the possibility of removing true midpoints from $b'_{est}$. The processor therefore implements an effective compromise by choosing M as the first trough in the $f_{hist}$ that is greater than or equal to $\sigma_{bn}$.

Returning to FIG. 3, after noise is removed from $b'_{est}$, the processor detects its zero crossings (step 62), calculates the distance between adjacent zero crossings (step 64) and stores these distances in a one-dimensional array, or feature vector (step 66). The elements in the feature vector thus correspond to the peak-to-valley distances in the waveform.

Since bar codes can be printed with any desired density, or stripe width, the processor normalizes the feature vector before further analysis (step 68).

Figure 11:
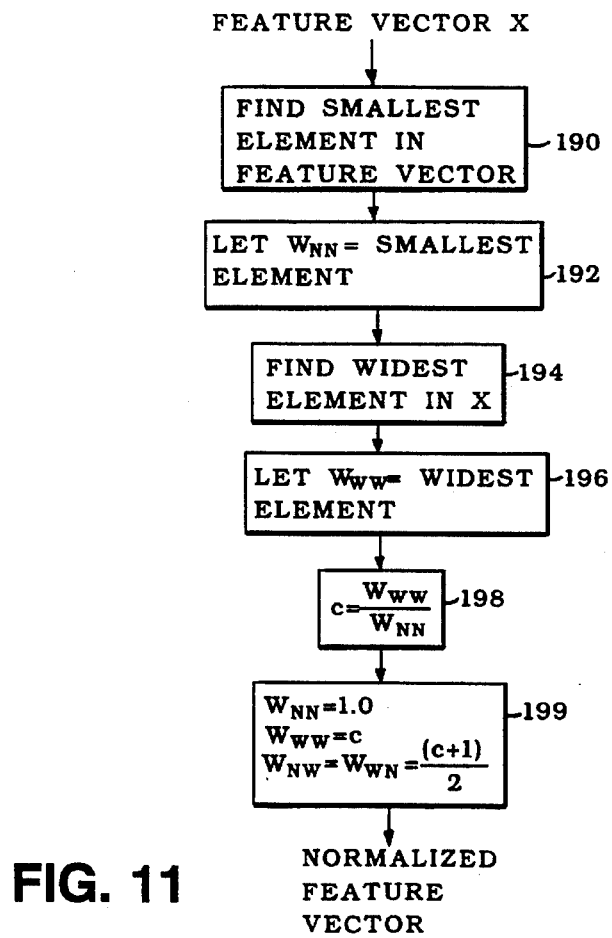
FIG. 11 is a block diagram of a normalization algorithm in the processor.

In CODE39 bar codes, the code stripes are either wide (W) or narrow (N). Let $W_{NN}$ represent the narrowest peak to valley distance in a character, and let $c=W_{WW}/W_{NN}$ be the ratio of the width of the wide stripes to the narrow stripes. There are only three peak to valley distances: $W_{NN}$, $W_{WW}$ and $W_{NW}$. In the normalization algorithm, shown in FIG. 11, the processor first finds the smallest element in the feature vector (step 190), identifies it as $W_{NN}$ (step 192), then finds the widest element (step 194), and identifies it as $W_{WW}$ (step 196). From these two values, the processor calculates c (step 198), then normalizes the feature vector (step 199) by replacing its elements with the following:

$$W_{NN}=1.0$$

$$W_{WW}=c$$

$$W_{WN}=W_{NW}=(c+1)/2$$

For the four-level UPC code, the processor replaces the midpoint to midpoint distances with the normalized distance listed in Table 1.

TABLE 1

Normalized distances for UCP symbology.

| Normalized distance | stripe–stripe |
|---|---|
| 1.0 | 1–1 |
| 1.5 | 1–2, 2–1 |
| 2.0 | 1–3, 3–1, 2–2 |
| 2.5 | 1–4, 4–1, 2–3, 3–2 |

The reference vectors in storage are formed and normalized identically to the feature vectors. In particular, the sum of the elements of the reference vectors must equal the sum of the elements of the feature vectors.

Returning to FIG. 3, after the feature vector for a particular waveform has been formed and normalized, the processor matches the feature vector to a closest reference vector using a statistical pattern recognition technique (steps 70 and 72). Let X be a feature vector with n elements $x_i$ and $M^k$ be a reference vector for class k with n elements $M^k_i$. The degree of similarity of the vectors is measured in terms of a distance metric D(X,k), defined as $$D(X,k)=[\Sigma_{i=1}^{n}(x_i-m_i^k)^2]^{1/2} \quad (11)$$

A classification rule employing distance metric D(X,k) is

Decide for class j if $D(x,j)<D(X,k)$ for all k, k≠j  (12)

Higher accuracy is achieved by labeling a feature vector that is not arbitrarily close to a reference vector as unclassified:

---
Decide for class j
if D(x,j) < min(D(x,k), $T_{misd}$) for all k, k ≠ j
else label X as unclassified
--- where $T_{misd}$ is a threshold value that controls the rate at which a feature vector is unclassified; the smaller the value of $T_{misd}$, the smaller the misclassification rate. A final classification rule accounts for the situation where the feature vector X may be close to two reference vectors: where $T_{diff}$ is a threshold that controls confidence in the first choice character; the larger the value of $T_{diff}$, the higher the confidence in the first choice character.

It should be noted that the space spanned by the feature vectors for a code with n edges in each character Decide for class j if  (14)

$D(X,j)$ < min($D(X,k) - T_{diff}$, $T_{misd}$) for all k, k ≠ j;
else return
i, j if $D(X,j)$, $D(X,i)$ < min($D(X,k)$, $T_{misd}$) for all k, k ≠ j
else label X as unclassified has (n–2) dimensions. The space of all characters is one dimension greater, since each character can be uniquely represented by its (n–1) distances between edges. As a result, two characters may correspond to the same reference array, for example, the UPC characters 1,7 and 2,8. A postprocessing stage 200 (FIG. 3) is used to select the most probable decoding for an ambiguous character. The postprocessing is based on a measurement of the midpoint-to-midpoint distance between the end of the ambiguous character and the beginning of its adjacent characters.

The analog waveform decoder described above exhibits at least a 43% increase in maximum scanning distance, or standard deviation in the PSF over standard decoders. The decoder is also sufficiently immune to noise over a wide range of conditions to meet the industry standard of only 1 in a million misclassified symbols for the CODE39 symbology.

Other embodiments are within the following claims. Steps in the decoding process may be combined for greater efficiency. For example, the deconvolver of FIG. 3 (step 56) can directly generate the derivative of the deconvolved waveform without ever calculating the waveform itself. This would eliminate the need for step 58.

The present invention may be implemented in a handheld, laser-scanning bar code reader unit such as illustrated in FIG. 12, although the analog waveform decoder may be located remotely from the laser scanning reader unit. This allows for the easy implementation of changes to the software and/or to the look-up table data base. In a preferred embodiment, the reader unit 40 is a gun-shaped device, having a pistol-grip type of handle 42 and movable trigger 44, employed to allow the user to activate the light beam 46 and detector circuitry when pointed at the symbol to be read, thereby saving battery life if the unit is selfpowered. A lightweight plastic housing 48 contains the laser light source, the detector 50, the optics and signal processing circuitry, and the CPU 52, as well as power source or battery 54. A light-transmissive window 58 in the front end of the housing 48 allows the outgoing light beam 46 to exit and the incoming reflected light 60 to enter. The reader 40 is designed to be aimed at a bar code symbol by the user from a position in which the reader 40 is spaced from the symbol, i.e., not touching the symbol or moving across the symbol. Typically, this type of hand-held bar code reader is specific to operate in the range of perhaps several inches.

As further depicted in FIG. 12, a suitable lens 62 (or multiple lens system) may be used to focus the scanned beam into the bar code symbol at an appropriate reference plane. A light source 64 such as a semiconductor laser diode is positioned to introduce a light beam into the axis of the lens 62, and the beam passes through a partially-silvered mirror 66 and other lenses or beam-shaping structure, as needed, along with an oscillating mirror 68 which is attached to a scanning motor 70 activated when the trigger 44 is pulled. If the light produced by the source 64 is not visible, an aiming light may be included in the optical system. The aiming light, if needed, produces a visible-light spot which may be fixed, or scanned just like the laser beam; the user employs this visible light to aim the reader unit at the symbol before pulling the trigger 44.

What is claimed is:

1. A method for decoding an analog waveform representative of information contained in a symbol, comprising the steps of:

storing a group of reference values corresponding to each symbol from an alphabet of possible symbols;

processing said analog waveform to find the locations of extrema in said waveform;

forming feature values from said extrema locations;

decoding said waveform by comparing said feature values to at least two groups of reference values to produce a signal indicative of the information contained in the symbol.

2. The method of claim 1, further comprising determining boundaries of said analog waveform to identify a decodable portion of said waveform, and subsequently processing only said decodable portion of said waveform.

3. The method of claim 1, further comprising storing a reference array corresponding to each group of reference values representative of information contained in a symbol from an alphabet of possible symbols, and forming a feature array from said extrema locations, wherein said decoding step comprises comparing said feature array to at least two reference arrays.

4. The method of claim 3, wherein said processing comprises calculating the distances between extrema in said analog waveform and storing said distances as elements in said feature array, wherein elements of each reference array for a symbol correspond to the distances between extrema in the analog waveform representative of the symbol.

5. The method of claim 4, further comprising normalizing each said reference array and said feature array.

6. The method of claim 5, wherein said decoding comprises calculating a distance metric from said feature array and one said reference array.

7. The method of claim 6, wherein said decoding further comprises matching said feature array to a reference array based on how close the feature array is to the reference array in terms of said distance metric.

8. The method of claim 7, wherein said decoding comprises matching a feature array to two reference arrays if a distance defined by said distance metric to both of said two reference arrays is substantially identical.

9. The method of claim 7, wherein said decoding comprises matching said feature to either a reference array or labeling said feature array as unclassified, and wherein said distance metric contains a threshold controlling a rate at which feature arrays are labeled as unclassified.

10. The method of claim 9, wherein said decoding comprises matching said feature array to either one reference array, to two reference arrays, or labeling said feature array as unclassified, and wherein said distance metric contains a second threshold that controls a level of confidence in a match to only one reference array.

11. The method of claim 3, wherein said step of storing comprises storing at least one said reference array in a training sequence.

12. The method of claim 3, wherein said step of storing comprises storing at least one said reference array directly from a known symbology.

13. The method of claim 1, wherein said processing comprises deblurring the analog waveform to produce an estimator function used in finding the extrema locations.

14. The method of claim 13, wherein said analog waveform is the convolution of a symbol pattern with a second function, and said deblurring is performed by deconvolving said analog waveform.

15. The method of claim 14, wherein said deblurring comprises a partial deconvolution of said analog waveform.

16. The method of claim 14, further comprising estimating said second function from said analog waveform before deconvolving.

17. The method of claim 16, wherein said estimation comprises estimating a standard deviation of said second function from said analog waveform.

18. The method of claim 13, wherein said processing comprises finding a zero crossing of a derivative of said estimator function.

19. The method of claim 18, wherein said processing comprises removing noise prior to finding the extrema locations, wherein the noise removal comprises establishing a threshold, and removing all extrema in the derivative of said estimator function with magnitude less than said threshold.

20. The method of claim 19, further comprising forming a histogram of extrema magnitudes and choosing the threshold at a trough in the histogram.

21. The method of claim 19, further comprising estimating a standard deviation of noise in the derivative of the estimator function, and choosing a threshold above or equal to said standard deviation of the noise.

22. The method of claim 21, further comprising estimating a standard deviation of noise in the derivative of the estimator function, and choosing the threshold as the standard deviation if said standard deviation coincides with a trough in said histogram, otherwise choosing a second trough greater than said standard deviation.

23. The method of claim 21 or 22 wherein said standard deviation is estimated from a root mean square of the derivative of the estimator function.

24. The method of claim 18, wherein said step of processing includes sampling and interpolating said analog waveform prior to finding said extrema locations, and wherein said processing is repeated if said waveform is unsuccessfully decoded to further smooth the waveform in a second interpolation.

25. The method of claim 1, wherein said processing comprises finding zero crossings of a derivative of said analog waveform.

26. The method of claim 25 or 18, wherein said processing further comprises passing said analog waveform through a low pass filter before taking said derivative to further reduce noise.

27. Claim 26, wherein the cutoff frequency of said low pass filter is chosen as half the inverse of the smallest extrema width in the analog waveform.

28. The method of claim 25, wherein said processing comprises removing noise prior to finding the extrema locations, wherein the noise removal comprises establishing a threshold, and removing all extrema in the derivative of said analog waveform with magnitude less than said threshold.

29. The method of claim 28, further comprising forming a histogram of extrema magnitudes and choosing the threshold at a trough in the histogram.

30. The method of claim 29, further comprising estimating a standard deviation of noise in the derivative of the analog waveform, and choosing the threshold as the standard deviation if said standard deviation coincides with a trough in said histogram, otherwise choosing a second trough greater than said standard deviation.

31. The method of claim 28, further comprising estimating a standard deviation of noise in the derivative of the analog waveform, and choosing a threshold above or equal to said standard deviation of the noise.

32. The method of claim 31 or 30 wherein said standard deviation is estimated from a root mean square of the derivative of the analog waveform.

33. The method of claim 1, wherein said processing comprises removing noise prior to finding the extrema locations.

34. The method of claim 1, wherein said processing includes sampling and interpolating said analog waveform, prior to finding said extrema locations, and wherein said processing is repeated if said waveform is unsuccessfully decoded to further smooth the waveform in a second interpolation.

35. A method for decoding an analog waveform representative of information contained in a symbol comprising the steps of:
storing a reference array corresponding to each symbol from an alphabet of possible symbols, wherein the elements of each reference array for a symbol correspond to the distances between extrema in the analog waveform representative of the symbol;
determining boundaries of said analog waveform to identify a decodable portion of said waveform,
processing said decodable portion to find locations of extrema in said decodable portion of said waveform, comprising
deblurring the analog waveform to find an estimator function,
taking a derivative of the estimator function,
removing noise from the derivative of the estimator function,
finding the extrema locations from the zero crossings of the estimator function;
forming a feature array from said extrema locations by calculating the distances between said extrema,
assigning said distances to elements of said feature array; and
decoding said waveform by comparing said feature array to each said reference array to produce a signal indicative of the information contained in the symbol.

36. An analog waveform decoder that operates upon an analog waveform representative of a symbol for decoding information in said symbol, said analog waveform decoder comprising:
a memory holding reference values, each group of reference values corresponding to a symbol from an alphabet of possible symbols;
a processor for analyzing said analog waveform to find locations of extrema in said waveform, said processor producing feature values for said waveform from said extrema locations,
wherein said processor decodes said waveform by comparing said feature values to at least two groups of reference values to produce a signal indicative of the information contained in the symbol.

37. The decoder of claim 36, wherein said processor determines boundaries of said analog waveform to identify a decodable portion of said waveform, and subsequently analyzes only said decodable portion of said waveform.

38. The method of claim 36 further comprising
a memory holding reference arrays, each reference array corresponding to a group of reference values representative of information contained in a symbol from an alphabet of possible symbols, wherein said processor forms a feature array from said extrema locations and decodes said waveform by comparing said feature array to at least two reference arrays.

39. The decoder of claim 38 wherein said processor calculates the distances between extrema in said analog waveform and stores said distances as elements in said feature array, wherein elements of each reference array for a symbol correspond to the distances between extrema in the analog waveform representative of the symbol.

40. The decoder of claim 39, wherein said feature array and each said reference array are normalized.

41. The decoder of claim 40, wherein said processor decodes said waveform by calculating a distance metric from said feature array and one said reference array.

42. The decoder of claim 41, wherein said processor decodes said waveform by matching said feature array to a reference array based on how close said feature array is to said reference array in terms of said distance metric.

43. The decoder of claim 42, wherein said processor matches said feature array to two reference arrays if a distance defined by said distance metric to both of said two reference arrays is substantially identical and said distance is smaller than a distance to any other reference array.

44. The decoder of claim 42, wherein said processor matches said feature array either to a reference array or labels said feature array as unclassified, and wherein said distance metric contains a threshold controlling a rate at which feature arrays are labeled as unclassified.

45. The decoder of claim 44, wherein said processor matches said feature array to either one reference array, to two reference arrays, or labels said feature array as unclassified, and wherein said distance metric contains a second threshold that controls a level of confidence in a match to only one reference array.

46. The decoder of claim 39, wherein said processor partially deconvolves said analog waveform.

47. The method of claim 46, wherein said processor estimates said second function from said analog waveform before deconvolving.

48. The decoder of claim 47, wherein said processor estimates said second function by estimating a standard deviation of said second function from said analog waveform.

49. The decoder of claim 38 wherein said reference storage comprises at least one reference array stored in a training sequence.

50. The decoder of claim 38 wherein said reference storage comprises at least one said reference array stored directly from a known symbology.

51. The decoder of claim 36, wherein said processor deblurs the analog waveform to produce an estimator function used in finding the extrema locations.

52. The decoder of claim 51, wherein said analog waveform is the convolution of a symbol pattern with a second function, and said processor deblurs said analog waveform by deconvolving said analog waveform.

53. The decoder of claim 51 wherein said processor finds a zero crossing of a derivative of said estimator function to locate said extrema.

54. The method of claim 53, wherein said processor removes noise from said analog waveform prior to finding the extrema locations, wherein the processor removes the noise by establishing a threshold, and removing all extrema in the derivative of said estimator function with magnitude less than said threshold.

55. The method of claim 54, wherein said processor forms a histogram of extrema magnitudes and chooses the threshold at a trough in the histogram.

56. The decoder of claim 54, wherein said processor estimates a standard deviation of noise in the derivative of the estimator function, and chooses a threshold above or equal to said standard deviation of the noise.

57. The decoder of claim 56, wherein said processor estimates a standard deviation of noise in the derivative of the estimator function, and chooses the threshold as the standard deviation if said standard deviation coincides with a trough in said histogram, and otherwise chooses a second trough greater than said standard deviation.

58. The decoder of claim 56 or 57 wherein said processor estimates said standard deviation from a root mean square of the derivative of the estimator function.

59. The decoder of claim 53 wherein processor samples and interpolates said analog waveform prior to finding said extrema locations, and wherein said processor interpolates said waveform a second time to further smooth the waveform before reprocessing if said waveform is unsuccessfully decoded in a first analysis.

60. The decoder of claim 36, wherein said processor finds zero crossings of a derivative of said analog waveform to locate the extrema of said waveform.

61. The decoder of claim 60, wherein said processor removes noise from said waveform prior to finding the extrema locations by establishing a threshold, and removing all extrema in the derivative of said analog waveform with magnitude less than said threshold.

62. The decoder of claim 61, wherein said processor forms a histogram of extrema magnitudes and chooses the threshold at a trough in the histogram.

63. The decoder of claim 62, wherein said processor estimates a standard deviation of noise in the derivative of the analog waveform, and chooses a threshold above or equal to said standard deviation of the noise.

64. The decoder of claim 60 or 63, wherein said decoder further comprises a low pass filter that filters said analog waveform before said processor takes said derivative of said waveform to further reduce noise.

65. The decoder of claim 64, wherein a cutoff frequency of said low pass filter half an inverse of the smallest extrema width in the analog waveform.

66. The decoder of claim 62, wherein said processor estimates a standard deviation of noise in the derivative of the analog waveform, and chooses the threshold as the standard deviation if said standard deviation coincides with a trough in said histogram, and otherwise chooses a second trough greater than said standard deviation.

67. The decoder of claim 63 or 66 wherein said processor estimates said standard deviation from a root mean square of the derivative of the analog waveform.

68. The decoder of claim 36, wherein said processor removes noise from said waveform prior to finding the extrema locations.

69. The decoder of claim 36, wherein said processor samples and interpolates said analog waveform prior to finding said extrema locations, and wherein said processor interpolates said waveform a second time to further smooth the waveform before reprocessing if said waveform is unsuccessfully decoded in a first analysis.

70. An analog waveform decoder that operates directly on an analog waveform representative of a symbol, for decoding information in said symbol, said decoder comprising:

reference storage for storing a reference array corresponding to each symbol from an alphabet of possible symbols, wherein the elements of each reference array for a symbol correspond to the distances between extrema in the analog waveform representative of the symbol;

a processor for determining boundaries of said analog waveform to identify a decodable portion of said waveform, and processing said decodable portion to find locations of extrema in said decodable portion of said waveform, said processing comprising deblurring the analog waveform to find an estimator function, taking a derivative of the estimator function, removing noise from the derivative of the estimator function, finding the extrema locations from the zero crossings of the estimator function;

forming a feature array from said extrema locations by calculating the distances between said extrema, assigning said distances to elements of said feature array; and decoding said waveform by comparing said feature array to each said reference array to produce a signal indicative of the information contained in the symbol.

* * * * *